US012475623B2

United States Patent
Khodadadeh et al.

(10) Patent No.: US 12,475,623 B2
(45) Date of Patent: Nov. 18, 2025

(54) GENERATING AND COMPOSITING HAIR PIXELS USING GENERATIVE NEURAL NETWORKS

(71) Applicant: Adobe Inc., San Jose, CA (US)

(72) Inventors: Siavash Khodadadeh, Mountain View, CA (US); Jinrong Xie, Sunnyvale, CA (US); Ratheesh Kalarot, San Jose, CA (US); Shabnam Ghadar, Menlo Park, CA (US)

(73) Assignee: Adobe Inc., San Jose, CA (US)

( * ) Notice: Subject to any disclaimer, the term of this patent is extended or adjusted under 35 U.S.C. 154(b) by 341 days.

(21) Appl. No.: 18/338,964

(22) Filed: Jun. 21, 2023

(65) Prior Publication Data

US 2024/0428482 A1    Dec. 26, 2024

(51) Int. Cl.

| | | |
|---|---|---|
| *G06T 11/60* | (2006.01) | |
| *G06T 3/18* | (2024.01) | |
| *G06T 5/20* | (2006.01) | |
| *G06T 5/77* | (2024.01) | |
| *G06T 7/11* | (2017.01) | |

(52) U.S. Cl.
CPC ............... *G06T 11/60* (2013.01); *G06T 3/18* (2024.01); *G06T 5/20* (2013.01); *G06T 5/77* (2024.01); *G06T 7/11* (2017.01); *G06T 2207/20084* (2013.01); *G06T 2207/20132* (2013.01); *G06T 2207/30201* (2013.01)

(58) Field of Classification Search
CPC ... G06T 11/60; G06T 3/18; G06T 5/20; G06T 5/77; G06T 7/11; G06T 2207/20084; G06T 2207/20132; G06T 2207/30201; G06T 11/00
See application file for complete search history.

(56) References Cited

U.S. PATENT DOCUMENTS 10,402,689 B1 *   9/2019   Bogdanovych ...... G06V 30/242
11,651,477 B2      5/2023   Zhang et al.
(Continued)

OTHER PUBLICATIONS

Natsume, Ryota, Tatsuya Yatagawa, and Shigeo Morishima. "Rsgan: face swapping and editing using face and hair representation in latent spaces." arXiv preprint arXiv:1804.03447 (2018). (Year: 2018).*

(Continued)

*Primary Examiner* — Andrae S Allison
(74) *Attorney, Agent, or Firm* — Keller Preece PLLC

(57) ABSTRACT

The present disclosure relates to systems, methods, and non-transitory computer readable media for generating and compositing pixels of a digital image that depict hair of an individual using generative neural networks. In some embodiments, the disclosed systems receive a modification to a face crop enclosing a face depicted within a digital image. In some cases, the disclosed systems determine, from the modification, modified hair pixels within the face crop of the digital image and unmodified hair pixels outside of the face crop of the digital image. The disclosed systems generate, for the unmodified hair pixels outside of the face crop, replacement hair pixels that resemble the modified hair pixels utilizing a generative neural network. Additionally, the disclosed systems generate a modified digital image by replacing the unmodified hair pixels outside of the face crop with the replacement hair pixels.

20 Claims, 9 Drawing Sheets

(56) References Cited

U.S. PATENT DOCUMENTS

| | | | |
|---|---|---|---|
| 2012/0075331 A1* | 3/2012 | Mallick | G06V 40/162 345/594 |
| 2019/0147224 A1 | 5/2019 | Li et al. | |
| 2022/0101577 A1* | 3/2022 | Chakrabarty | G06T 7/11 |
| 2022/0180490 A1* | 6/2022 | Jo | G06N 3/088 |
| 2022/0284646 A1* | 9/2022 | Saha | G06T 11/60 |
| 2022/0375090 A1 | 11/2022 | Hwang et al. | |
| 2023/0128792 A1 | 4/2023 | Kuen et al. | |
| 2023/0132180 A1 | 4/2023 | Hsieh et al. | |
| 2023/0259587 A1 | 8/2023 | Lin et al. | |
| 2024/0143835 A1* | 5/2024 | Khodadadeh | G06F 21/6254 |
| 2024/0152757 A1* | 5/2024 | Azizi | G06V 40/172 |
| 2024/0412328 A1* | 12/2024 | Chung | G06T 11/001 |
| 2024/0412432 A1* | 12/2024 | Chung | G06T 11/001 |

OTHER PUBLICATIONS

Liu, Fengyuan, et al. "High fidelity face swapping via semantics disentanglement and structure enhancement." Proceedings of the 31st ACM International Conference on Multimedia. 2023. (Year: 2023).*

Levinshtein, C. Chang, E. Phung, I. Kezele, W. Guo and P. Aarabi, "Real-Time Deep Hair Matting on Mobile Devices," 2018 15th Conference on Computer and Robot Vision (CRV), Toronto, ON, Canada, 2018, pp. 1-7, doi: 10.1109/CRV.2018.00011. (Year: 2018).*

Zhu, Peihao, et al. "Barbershop: Gan-based image compositing using segmentation masks." arXiv preprint arXiv:2106.01505 (2021). (Year: 2021).*

Connelly Barnes, et al. "PatchMatch: A Randomized Correspondence Algorithm for Structural Image Editing," ACM Transactions on Graphics vol. 28, Issue 3, Article No. 24. pp 1-11. Jul. 27, 2009.

Jun-Yan Zhu, et al. "Generative Visual Manipulation on the Natural Image Manifold," Computer Vision—European Conference on Computer Vision. pp 597-613. Sep. 16, 2016.

Shengyu Zhao, et al. "Large Scale Image Completion via Co-Modulated Generative Adversarial Networks," arXiv:2103.10428 (2021). International Conference on Learning Representations. pp. 1-25. Mar. 18, 2021.

Tero Karras, et al. "A Style-Based Generator Architecture for Generative Adversarial Networks," arXiv:1812.04948. 2019 IEEE/CVF Conference on Computer Vision and Pattern Recognition (CVPR). pp. 1-12. Mar. 29, 2019.

Yu Zeng, et al. "High-Resolution Image Inpainting with Iterative Confidence Feedback and Guided Upsampling," European Conference on Computer Vision, pp. 1-17. May 24, 2020.

* cited by examiner

GENERATING AND COMPOSITING HAIR PIXELS USING GENERATIVE NEURAL NETWORKS

BACKGROUND

In the field of digital image editing, deep generative models have become increasingly effective in various applications, such as producing realistic images from randomly sampled seeds or image inpainting. These models, such as generative adversarial networks ("GANs"), have revolutionized digital image synthesis, enabling digital image modifications by extracting and combining features across digital images. Indeed, GANs have made significant progress in generating or synthesizing pixels for adjusting the style of, or replacing original pixels within, a digital image. Despite the advances of existing digital image systems that utilize these models, however, these conventional systems continue to suffer from a number of disadvantages, such as accuracy in modifying digital images in areas outside of an edited image crop.

SUMMARY

This disclosure describes one or more embodiments of systems, methods, and non-transitory computer readable media that solve one or more of the foregoing or other problems in the art by generating and compositing hair pixels using generative neural networks. For example, the disclosed systems generate replacement hair pixels to resemble modified hair pixels that result from an image modification applied to a face region of a digital image. In some embodiments, the disclosed systems generate the replacement hair pixels by utilizing a generative neural network informed by modified hair pixels within the face region so that the replacement hair pixels resemble the style and appearance of the modified hair pixels.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
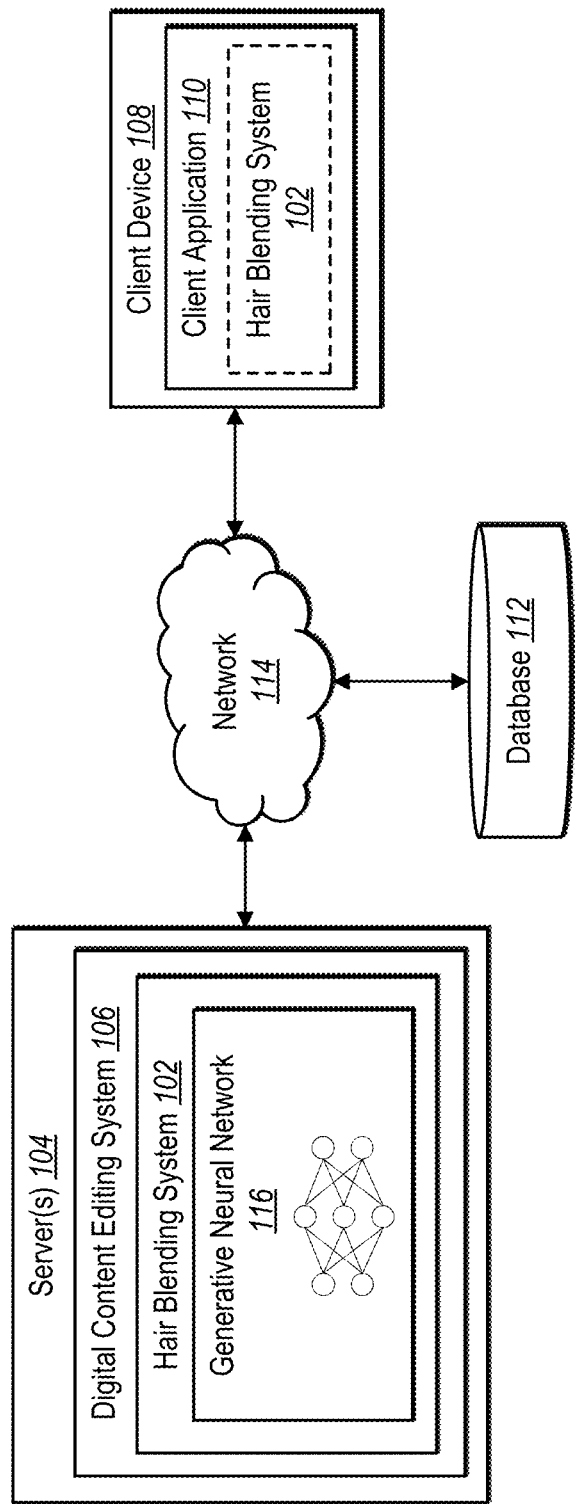
FIG. 1 illustrates an example system environment in which a hair blending system operates in accordance with one or more embodiments.

This disclosure describes one or more embodiments of a hair blending system that generates and composites hair pixels for digital images using generative neural networks. As suggested above, many conventional digital image systems exhibit a number of shortcomings or disadvantages, particularly in their accuracy of generating pixels for editing digital images. For example, when editing a digital image depicting one or more faces, some existing systems utilize model architectures (e.g., GANs) or image editing processes that only account for pixels within particular areas or regions indicated by image crops. Specifically, existing systems often edit a digital image to change the appearance of an individual's face by applying the edit only to pixels within a face region (e.g., a face crop) that encompasses the face pixels along with some nearby hair pixels caught in the face region. Consequently, some existing systems generate modified digital images that are unrealistic and visually jarring, with clear breaks between modified hair pixels where the edit was applied within the face region and unmodified hair pixels outside of the face region (and therefore unedited).

As a contributing factor to their inaccuracies, some existing digital image systems utilize computer vision algorithms to synthesize patches of hair for regions outside of a face crop. However, while existing computer vision algorithms are capable of identifying pixels to fill or replace pixels in other regions of an image, such as hair pixels, the patch-based approach of such existing systems is prone to exhibit poor continuity across a crop boundary. These continuity problems sometimes result in images that show lines or clear boundary distinctions, especially comparing hair pixels within a face crop to hair pixels outside of the face crop.

As mentioned above, in some embodiments the hair blending system described herein generates replacement pixels for more natural, accurate blending between edited hair pixels within a face crop and unedited hair pixels outside of the face crop. For example, the hair blending system utilizes a generative neural network to generate replacement pixels based on edited or modified pixels within a face crop. In some cases, the hair blending system receives or determines an edit or a modification made to pixels in a face crop of a digital image, and the hair blending system further distinguishes between the hair pixels within the face crop (e.g., modified hair pixels) and hair pixels outside of the face crop (e.g., unmodified hair pixels).

To elaborate, in one or more embodiments, the hair blending system generates a deep hair matte by segmenting the digital image using instance segmentation and part segmentation processes. For example, the hair blending system utilizes an instance segmentation model to generate an instance segmentation map for the digital image (e.g., to distinguish between different instances of objects belonging to the same classification, such as multiple depicted faces or individuals). In some cases, the hair blending system further utilizes a part segmentation model to generate a part segmentation map for landmark detection to indicate different facial landmarks, such as eyes, nose, mouth, and hair. In some embodiments, the hair blending system further generates a deep hair matte using a deep matting model to process the part segmentation map. For instance, the hair blending system generates a deep hair matte that masks non-hair pixels in fine, accurate detail.

Additionally, in some embodiments, the hair blending system determines portions of the deep hair matte corresponding to modified hair pixels and portions corresponding to unmodified hair pixels. For example, the hair blending system crops the deep hair matte (or otherwise distinguishes between edited and unedited hair pixels) according to the face crop used for editing the digital image. Accordingly, in some cases, the hair blending system determines masked hair pixels and unmasked hair pixels from the deep hair matte, where the masked hair pixels correspond to modified pixels within the face crop and the unmasked hair pixels correspond to unmodified pixels outside of the face crop.

In certain embodiments, the hair blending system further utilizes a generative neural network to generate a modified digital image by generating replacement hair pixels to replace hair pixels that are unmasked by the deep hair matte. For example, the hair blending system utilizes a generative neural network to generate, from the digital image and the uncropped portion of the deep hair matte, replacement hair pixels that resemble the edited or modified hair pixels within the face crop. In some cases, the hair blending system further composites the replacement hair pixels with the modified digital image to replace unmodified hair pixels outside of the face crop, thus resulting in a realistic image with blended hair.

As suggested above, embodiments of the hair blending system provide a variety of improvements or advantages over conventional digital image systems. For example, embodiments of the hair blending system improve accuracy over prior systems. Indeed, while some prior systems apply image edits only to face crops of digital images, the hair blending system utilizes a blending and composition process to generate hair pixels for more accurate, seamless transitions across crop boundaries. For example, the hair blending system generates replacement hair pixels using a generative neural network guided by a deep hair matte to modify hair pixels in a digital image more accurately. As a result, the hair blending system generates modified digital images that are more realistic that prior systems which often produce jarring and distinct lines at crop boundaries.

To achieve such improved accuracy, in some embodiments, the hair blending system generates a deep hair matte as a guide for identifying hair pixels to replace outside of a face crop. Indeed, as opposed to prior systems that rely on computer vision algorithms for patch-based inpainting, the hair blending system uses an instance segmentation model, a part segmentation model, and a deep matting model to identify hair pixels to replace within a digital image (e.g., outside of a face crop). Accordingly, the hair blending system generates more accurately identifies and replaces hair pixels than prior systems, resulting in more realistic modified digital images where the hair pixels outside of an edited face crop resemble those with the face crop more closely.

Additional detail regarding the hair blending system will now be provided with reference to the figures. For example, FIG. 1 illustrates a schematic diagram of an example system environment for implementing a hair blending system 102 in accordance with one or more embodiments. An overview of the hair blending system 102 is described in relation to FIG. 1. Thereafter, a more detailed description of the components and processes of the hair blending system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 9.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 9. The client device 108 communicates with the server(s) 104 via the network 114. For example, the client device 108 provides information to server(s) 104 indicating client device interactions (e.g., digital image selections, face editing requests, or other input) and receives information from the server(s) 104 such as edited digital images. Thus, in some cases, the hair blending system 102 on the server(s) 104 provides and receives information based on client device interaction via the client device 108.

As shown in FIG. 1, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. Based on instructions from the client application 110, the client device 108 presents or displays information to a user, including digital images such as initial (e.g., captured, uploaded, or un-modified) digital images, edited/modified digital images, and/or selectable options for editing digital images. In some cases, the client application 110 includes all or part of the hair blending system 102 and/or the generative neural network 116.

As illustrated in FIG. 1, the environment includes the server(s) 104. The server(s) 104 generates, tracks, stores, processes, receives, and transmits electronic data, such as image editing inputs, initial digital images, and/or edited digital images. For example, the server(s) 104 receives data from the client device 108 in the form of an indication of a client device interaction to edit a digital image. In response, the server(s) 104 transmits data to the client device 108 to cause the client device 108 to display or present an edited digital image based on the client device interaction.

In some embodiments, the server(s) 104 communicates with the client device 108 to transmit and/or receive data via the network 114, including client device interactions, image editing requests, digital images, and/or other data. In some embodiments, the server(s) 104 comprises a distributed server where the server(s) 104 includes a number of server devices distributed across the network 114 and located in different physical locations. The server(s) 104 comprise a content server, an application server, a communication server, a web-hosting server, a multidimensional server, a container orchestration server, or a machine learning server. The server(s) 104 further access and utilize the database 112 to store and retrieve information such as stored digital images, edited digital images, instance maps, part maps, deep hair mattes, and/or other data.

As further shown in FIG. 1, the server(s) 104 also includes the hair blending system 102 as part of a digital content editing system 106. For example, in one or more implementations, the digital content editing system 106 is able to store, generate, modify, edit, enhance, provide, distribute, and/or share digital content, such as modified digital images. For example, the digital content editing system 106 provides tools for the client device 108, via the client application 110, to generate modified digital images utilizing the generative neural network 116.

In one or more embodiments, the server(s) 104 includes all, or a portion of, the hair blending system 102. For example, the hair blending system 102 operates on the server(s) to generate and provide modified digital images. In some cases, the hair blending system 102 utilizes, locally on the server(s) 104 or from another network location (e.g., the database 112), a generative neural network 116 to generate modified digital images. In addition, the hair blending system 102 includes or communicates with a generative neural network for implementation and training.

In certain cases, the client device 108 includes all or part of the hair blending system 102. For example, the client device 108 generates, obtains (e.g., downloads), or utilizes one or more aspects of the hair blending system 102 from the server(s) 104. Indeed, in some implementations, as illustrated in FIG. 1, the hair blending system 102 is located in whole or in part on the client device 108. For example, the hair blending system 102 includes a web hosting application that allows the client device 108 to interact with the server(s) 104. To illustrate, in one or more implementations, the client device 108 accesses a web page supported and/or hosted by the server(s) 104.

In one or more embodiments, the client device 108 and the server(s) 104 work together to implement the hair blending system 102. For example, in some embodiments, the server(s) 104 train one or more neural networks discussed herein and provide the one or more neural networks to the client device 108 for implementation. In some embodiments, the server(s) 104 train one or more neural networks, the client device 108 request image edits, the server(s) 104 generate modified digital images utilizing the one or more neural networks. Furthermore, in some implementations, the client device 108 assists in training one or more neural networks.

Although FIG. 1 illustrates a particular arrangement of the environment, in some embodiments, the environment has a different arrangement of components and/or may have a different number or set of components altogether. For instance, as mentioned, the hair blending system 102 is implemented by (e.g., located entirely or in part on) the client device 108. In addition, in one or more embodiments, the client device 108 communicates directly with the hair blending system 102, bypassing the network 114. Further, in some embodiments, the generative neural network 116 includes one or more components stored in the database 112, maintained by the server(s) 104, the client device 108, or a third-party device.

Figure 2:
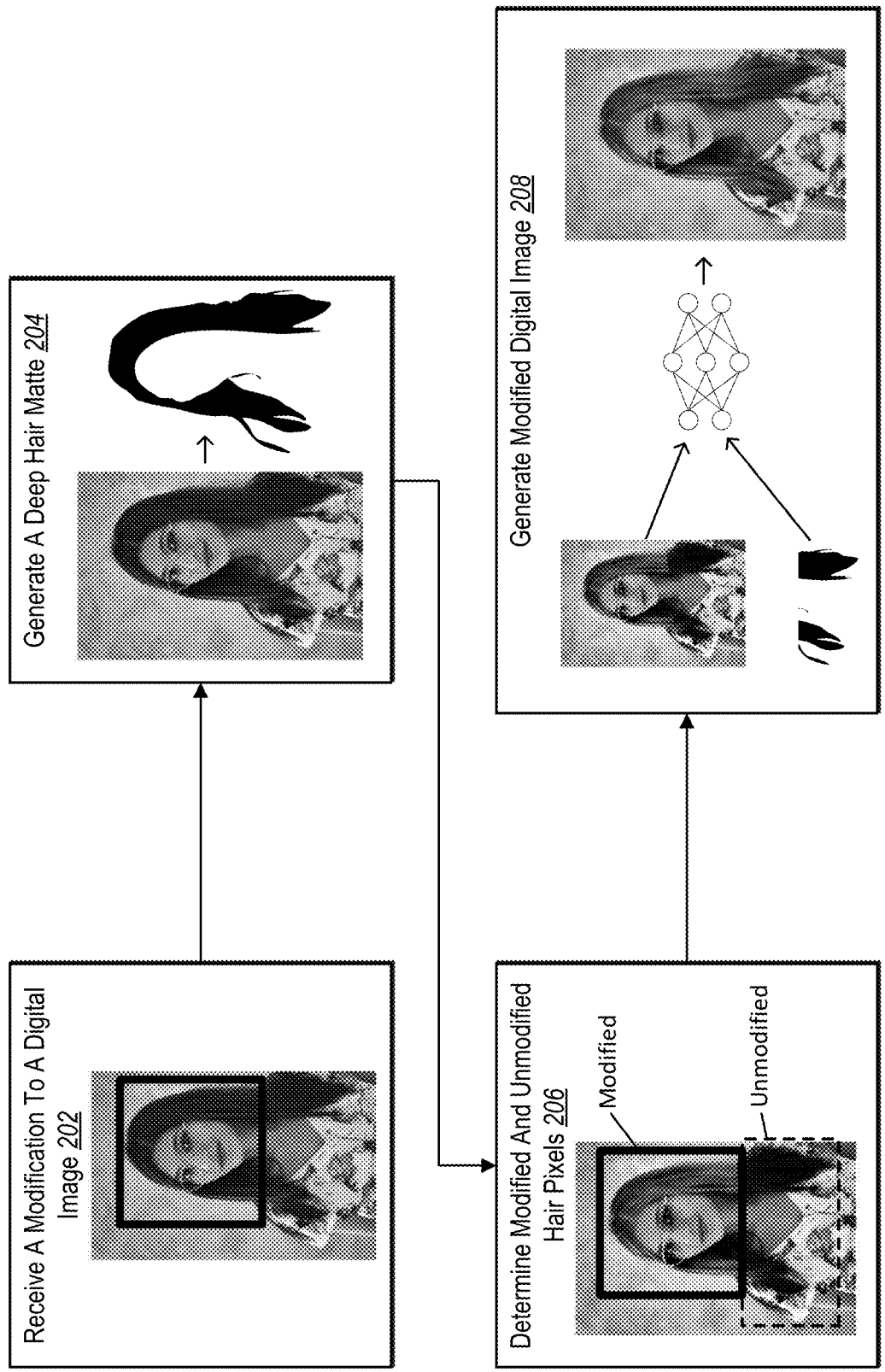
FIG. 2 illustrates an overview of generating a modified digital image utilizing a generative neural network to replace hair pixels in accordance with one or more embodiments.

As mentioned, in one or more embodiments, the hair blending system 102 generates a modified digital image by generating hair pixels to replace unedited hair pixels outside of an edited face crop. In particular, the hair blending system 102 blends pixels of unedited portions with those of edited portions of a digital image so that hair within the image transitions smoothly across crop boundaries. FIG. 2 illustrates in an overview of generating a modified digital image by using replacement hair pixels in accordance with one or more embodiments. Additional detail regarding the various acts of FIG. 2 is provided thereafter with reference to subsequent figures.

As illustrated in FIG. 2, the hair blending system 102 performs an act 202 to receive a modification to a digital image. In particular, the hair blending system 102 receives, detects, or determines a modification to a digital image that is the result of an image edit, such as an edit to change a hair color, a hair length, a hair waviness, an age, or some other visual characteristic of the digital image (e.g., characteristics that indirectly impact the appearance of hair, such as lighting, age, and yaw). In some cases, the hair blending system 102 generates or applies a modification to a digital image by using a neural network, such as a generative neural network, to apply image changes. For example, the hair blending system 102 determines or receives an image modification to a face region (e.g., a face crop) bounding, enclosing, or encompassing a particular area or region of the digital image (e.g., a square or rectangular region of particular dimensions including face pixels and other nearby pixels).

In one or more embodiments, a neural network refers to a machine learning model that can be trained and/or tuned based on inputs to generate predictions, determine classifications, or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, or a generative adversarial neural network.

Along these lines, a generative neural network includes a neural network that generates or modifies image pixels based on an input. For example, a generative neural network refers to a generative adversarial neural network that inpaints or replaces pixels of a digital image with synthetic pixels. In some cases, a generative adversarial neural network ("GAN") refers to a neural network that is tuned or trained via an adversarial process to generate an output digital image from an input such as a noise vector. For example, a generative adversarial neural network includes multiple constituent neural networks such as one or more encoder neural networks and one or more generator (or decoder) neural networks. In some cases, an encoder neural network extracts latent code from a noise vector or from a digital image. A generator neural network (or a combination of generator neural networks) generates a modified digital image by combining or otherwise processing extracted latent code (e.g., from the encoder neural network(s)). During training, a discriminator neural network, in competition with the generator neural network, analyzes a generated digital image to generate a realism prediction by determining whether the generated digital image is real (e.g., from a set of stored digital images) or fake (e.g., not from the set of stored digital images). Using one or more loss functions, the discriminator neural network also informs modification of parameters of encoder neural network(s), generator neural network(s), and/or the discriminator neural network to eventually generate digital images that fool the discriminator neural network into indicating that a generated digital image is a real digital image.

As further illustrated in FIG. 2, the hair blending system 102 performs an act 204 to generate a deep hair matte. To elaborate, the hair blending system 102 generates a deep hair matte that separates hair pixels (e.g., pixels of a digital image that depict hair, such as hair of an individual shown in the image) from non-hair pixels of a digital image. For example, the hair blending system 102 generates a deep hair matte in the form of a detailed, granular pixel mask that distinguishes between hair pixels (leaving them unmasked) and non-hair pixels (masking them).

To generate a deep hair mask, in some embodiments, the hair blending system 102 identifies or detects hair pixels within a digital image. Indeed, the hair blending system 102 utilizes an instance segmentation model to segment a digital image and generate an instance segmentation map that indicates instances of different objects depicted within the image, such as different individuals or different faces. In some cases, an instance segmentation model includes a neural network that analyzes pixels of a digital image to label or classify regions or groups of pixels belonging to respective classifications (e.g., "Face," "Body," and "Chair"). For instance, an instance segmentation model analyzes a digital image and generates labels for, and/or boundaries between, object classifications and further generates instance classifications to distinguish between different instances of the same object (e.g., "Face 1," "Face 2," and "Face 3").

In addition, the hair blending system 102 identifies different landmarks or features associated with the object instances depicted in a digital image. For example, the hair blending system 102 utilizes a part segmentation model to determine, detect, or identify eyes, noses, mouths, and hair landmarks of a face depicted within a digital. In some cases, a part segmentation model includes a neural network that generates labels for, and/or boundaries between, regions or groups of pixels depicting various landmarks. For example, a part segmentation model generates a part segmentation map (from an instance segmentation map) that indicates pixels for different landmarks, including hair pixels depicted with a digital image.

Further, the hair blending system 102 utilizes an instance segmentation map and/or a part segmentation map to generate a deep hair matte. More specifically, the hair blending system 102 utilizes a deep matting model to generate a detailed, granular image mask to precisely distinguish between hair pixels and non-hair pixels of a digital image. In some cases, a deep matting model includes a neural network that generates an image matte to mask certain pixels belonging (or not belonging) to a particular classification or label. For example, a deep matting model masks non-hair pixels indicated by a part segmentation map at a high level of detail and/or at a high resolution to accurately indicate (unmasked) pixels where hair is depicted at a fine level of detail. Indeed, the deep matting model is able to capture the detail necessary for identifying hair pixels, where hair is often very fine and otherwise difficult to capture with less detailed image masks.

As further illustrated in FIG. 2, the hair blending system 102 performs an act 206 to determine modified and unmodified hair pixels. To elaborate, the hair blending system 102 determines hair pixels within a digital image that are modified as a result of the modification of the act 202, and further determines hair pixels that are left unaffected or unmodified. For example, the hair blending system 102 determines modified hair pixels as those pixels within the bounds of a face crop used to apply an image modification. The hair blending system 102 thus also determines unmodified hair pixels as those pixels outside of the bounds of the face crop (e.g., in regions of the digital image where the modification was not applied).

As also illustrated in FIG. 2, the hair blending system 102 performs an act 208 to generate a modified digital image. More specifically, the hair blending system 102 generates a modified digital image by blending hair pixels of an edited image (e.g., an image with pixels edited within a face crop) with newly generated hair pixels to replace those hair pixels left unmodified by an image edit. For instance, the hair blending system 102 utilizes a generative neural network to generate replacement hair pixels from an edited digital image and a deep hair matte. In some cases, the generative neural network generates the replacement hair pixels for the unmodified hair pixels as informed by the modified hair pixels so that the newly generated replacement hair pixels resemble the modified hair pixels. Accordingly, the hair blending system 102 generates a modified digital image by blending or compositing the replacement hair pixels with the edited digital image, resulting in a modified image depicting hair pixels in regions inside and outside of the face crop that appear affected by the image edit.

Figure 3:
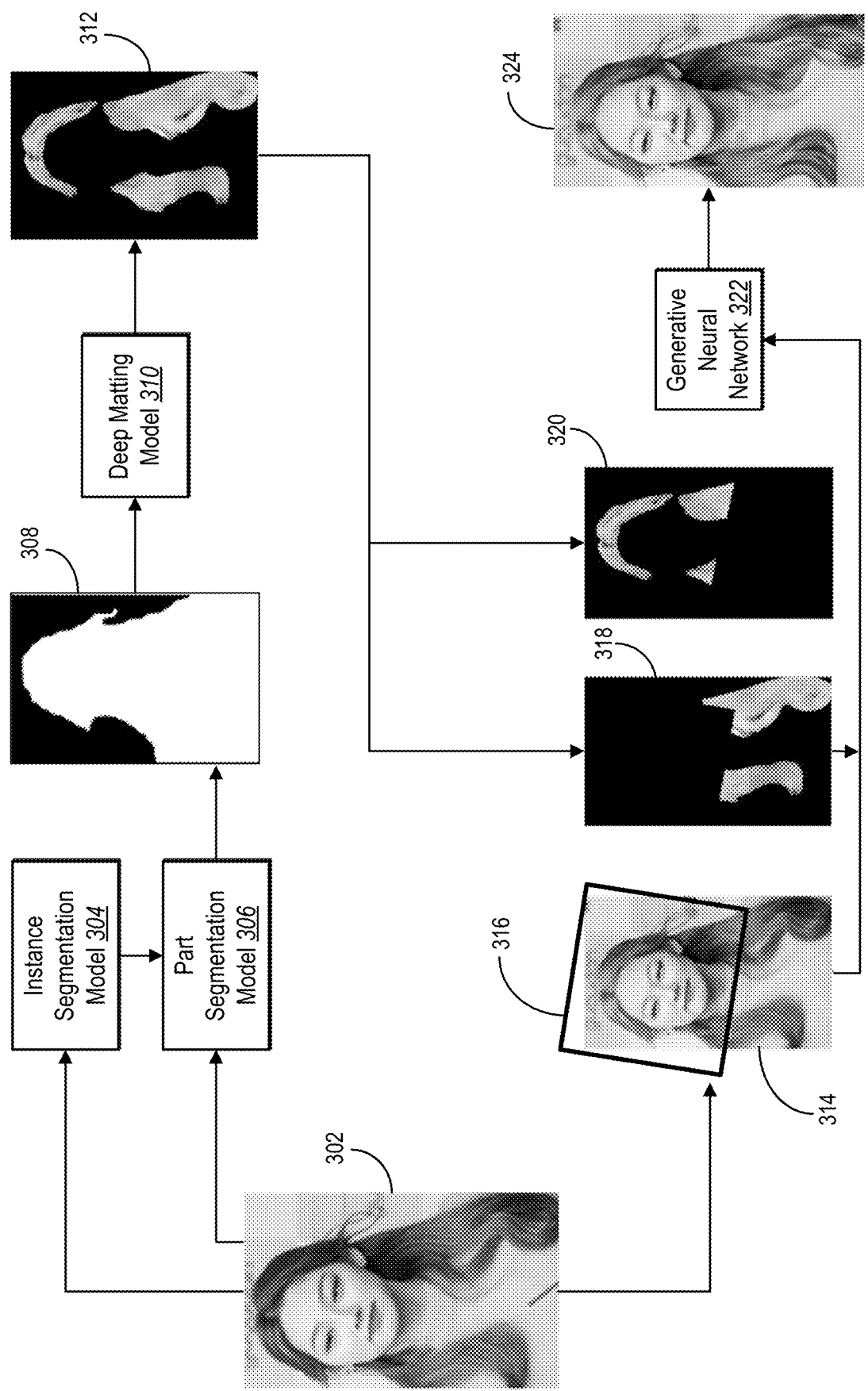
FIG. 3 illustrates an example diagram of generating a modified digital image for replacing hair pixels using various models in accordance with one or more embodiments.

As mentioned above, in certain described embodiments, the hair blending system 102 generates a modified digital image by replacing unmodified hair pixels with replacement hair pixels. In particular, the hair blending system 102 generates replacement hair pixels according to a deep hair matte that indicates which pixels to generate as replacements to match a visual appearance of an edit applied to a face crop. FIG. 3 illustrates an example diagram for generating a modified digital image using a generative neural network approach involving a deep hair matte in accordance with one or more embodiments.

As illustrated in FIG. 3, the hair blending system 102 accesses, receives, or identifies a digital image 302. For example, the hair blending system 102 receives an upload of the digital image 302 or a request to access the digital image 302 from a repository of digital images (e.g., within the database 112) from the client device 108. In some cases, the hair blending system 102 provides an image editing interface for editing or modifying the digital image 302.

Indeed, in some embodiments, the hair blending system 102 further receives or generates an edited digital image 314. Specifically, the hair blending system 102 receives or generates the edited digital image 314 as an edited version of the digital image 302 where one or more editing operations have been applied. For example, the hair blending system 102 generates the edited digital image 314 by applying an editing operation to the digital image 302 using a generative neural network to adjust one or more visual characteristics, such as a hair length, a hair color, or an age associated with the depicted face. In some cases, the hair blending system 102 generates the edited digital image 314 by applying an editing operation to pixels encompassed or enclosed within a face crop 316. As shown, the hair blending system 102 applies an editing operation to alter the appearance of pixels within the face crop 316 while leaving other pixels unchanged (e.g., as they appear within the digital image 302).

For instance, the hair blending system 102 uses a generative neural network for image editing in the form of a StyleGAN network as described by Tero Karras, Samuli Lane, and Timo Aila in *A Style-Based Generator Architecture for Generative Adversarial Networks*, arXiv: 1812.04948 (2018). In some cases, the hair blending system 102 generates the edited digital image 314 by using one or more neural network architectures described in U.S. patent application Ser. No. 17/663,635 entitled INTERACTIVE REMOTE DIGITAL IMAGE EDITING UTILIZING A SCALABLE CONTAINERIZED ARCHITECTURE, assigned to Adobe Inc., which is hereby incorporated by reference in its entirety. In some embodiments, the hair blending system 102 uses a generative neural network for image editing in the form of the iGAN described by Jun-Yan Zhu, Philipp Krahenbuhl, Eli Shechtman, and Alexei A.

Efros in *Generative Visual Manipulation on the Natural Image Manifold*, European Conference on Computer Vision 597-613 (2016). In other embodiments, the generative neural network for image editing is a StyleGAN2, RealnessGAN, ProGAN, or any other suitable generative neural network. In certain cases, the generative neural network for image editing is a neural network other than a generative neural network, and takes the form of, for example, a PixelRNN or a PixelCNN.

As further illustrated in FIG. 3, the hair blending system 102 generates a part segmentation map 308 (from the digital image 302) that masks background pixels and leaves foreground pixels, such as face pixels, hair pixels, and body pixels unmasked (or vice-versa). To generate the part segmentation map 308, as shown, the hair blending system 102 utilizes an instance segmentation model 304 and a part segmentation model 306. To elaborate, the hair blending system 102 utilizes the instance segmentation model 304 to generate, extract, or encode an instance segmentation map from the digital image 302. More particularly, the hair blending system 102 generates or extracts an instance segmentation map that defines pixels belonging to respective classifications or categories and that further defines different instances for various classifications or categories. For example, the hair blending system 102 generates the instance segmentation map to include boundaries between groups of pixels belonging to different classifications and/or different instances of the same classification. For instance, the instance segmentation model 304 generates an instance segmentation map to distinguish between different faces depicted within a digital image. In some cases, the instance segmentation model 304 is a DomoV2 model, as described in U.S. patent application Ser. No. 17/589,114 entitled DETECTING DIGITAL OBJECTS AND GENERATING OBJECT MASKS ON DEVICE, assigned to Adobe Inc., which is hereby incorporated by reference in its entirety.

As further illustrated in FIG. 3, the hair blending system 102 utilizes a part segmentation model 306 as part of generating the part segmentation map 308. To elaborate, the hair blending system 102 utilizes the part segmentation model 306 to generate, encode, or extract the part segmentation map 308 that indicates facial landmarks depicted within the digital image 302. For instance, the hair blending system 102 utilizes the part segmentation model 306 to detect and generate labels or classifications for various landmarks, such as eyes, nose, mouth, and hair. In some cases, the part segmentation model 306 generates the part segmentation map 308 to indicate hair pixels depicted within the digital image 302 by masking non-hair pixels. Specifically, the part segmentation model 306 masks non-hair pixels for one or more faces identified within the digital image 302, as informed by the instance segmentation map from the instance segmentation model 304. Accordingly, if a digital image depicts multiple faces, the hair blending system 102 indicates (or leaves unmasked) only those hair pixels of a face that is edited, rather than all hair pixels in the image.

In some cases, the part segmentation model 306 identifies facial landmarks within an image by identifying facial attributes (e.g., via key points of facial attributes) depicted with the image. For instance, the part segmentation model 306 utilizes facial landmark detection techniques such as, but not limited to, holistic approaches, constrained local model (CLM) approaches regression-based approaches, deep learning methods (e.g., style aggregated networks). In one or more embodiments, the part segmentation model 306 is a neural network like that described in U.S. Patent Application Publication No. 2019/0147224, entitled NEURAL NETWORK BASED FACE DETECTION AND LANDMARK LOCALIZATION assigned to Adobe Inc., and hereby incorporated by reference in its entirety. In certain cases, the part segmentation model 306 is a SegmentationV4 model or a model as described in U.S. patent application Ser. No. 17/585,140 entitled UPSAMPLING AND REFINING SEGMENTATION MASKS or U.S. patent application Ser. No. 17/319,979 entitled GENERATING IMPROVED PANOPTIC SEGMENTED DIGITAL IMAGES BASED ON PANOPTIC SEGMENTATION NEURAL NETWORKS THAT UTILIZE EXAMPLAR UNKNOWN OBJECT CLASSES, both assigned to Adobe Inc., which are hereby incorporated by reference in their entireties.

As also illustrated in FIG. 3, the hair blending system 102 generates a deep hair matte 312 from the part segmentation map 308. In particular, the hair blending system 102 generates the deep hair matte 312 to convert the part segmentation map 308 into a more detailed, fine-grain mask for identifying hair pixels. For instance, the hair blending system 102 utilizes a deep matting model 310 to process the part segmentation map 308 to thereby generate the deep hair matte 312. As shown, the deep hair matte 312 depicts fine hair details of areas or locations in the digital image 302 corresponding to hair pixels (e.g., pixel coordinates where hair pixels are depicted). Accordingly, the hair blending system 102 masks non-hair pixels of the digital image 302 and leaves hair pixels unmasked (or vice-versa). In some cases, the hair blending system 102 utilizes a deep matting model 310 in the form of a model as described in U.S. patent application Ser. No. 16/988,055 entitled GENERATING AN IMAGE MASK FOR A DIGITAL IMAGE BY UTILIZING A MULTI-BRANCH MASKING PIPELINE WITH NEURAL NETWORKS, assigned to Adobe Inc., which is hereby incorporated by reference in its entirety.

As further illustrated in FIG. 3, the hair blending system 102 utilizes the deep hair matte 312 to generate a modified digital image 324. Indeed, as part of generating the modified digital image 324, the hair blending system 102 generates an uncropped hair matte 318 and a cropped hair matte 320 from the deep hair matte 312. More specifically, the hair blending system 102 generates the uncropped hair matte 318 and the cropped hair matte 320 by cropping the deep hair matte 312 according to (e.g., to match or align with) the face crop 316. Indeed, as shown, the hair blending system 102 separates, or delineates between, portions of the deep hair matte 312 corresponding to modified hair pixels (e.g., within the face crop 316), as indicated by the cropped hair matte 320, and portions of the deep hair matte 312 corresponding to unmodified hair pixels (e.g., outside of the face crop 316), as indicated by the uncropped hair matte 318. Accordingly, the uncropped hair matte 318 indicates (e.g., as unmasked hair pixels) hair pixels to replace with replacement pixels.

Additionally, the hair blending system 102 generates the modified digital image 324 from the uncropped hair matte 318. More particularly, the hair blending system 102 generates the modified digital image 324 from the uncropped hair matte 318 and the edited digital image 314. Indeed, the hair blending system 102 inputs the edited digital image 314 and the uncropped hair matte 318 into a generative neural network 322 which generates replacement pixels. Indeed, the generative neural network 322 generates replacement pixels to replace the hair pixels indicated by the uncropped hair matte. In some cases, the generative neural network 322 generates the replacement hair pixels based on data from pixels within the face crop 316 so that the replacement hair pixels resemble the modified/edited hair pixels within the face crop 316. In one or more embodiments, a CoModGAN network described by S. Zhao, J. Cui, Y. Sheng, Y. Dong, X. Liang, E. I. Chang, and Y. Xu in *Large Scale Image Completion via Co-Modulated Generative Adversarial Networks*, arXiv:2103.10428 (2021). In certain embodiments, the generative neural network 322 is a neural network as described in U.S. patent application Ser. No. 17/650,967 entitled LEARNING PARAMETERS FOR GENERATIVE INPAINTING NEURAL NETWORKS UTILIZING OBJECT-AWARE TRAINING AND MASKED SEGMENTATION (e.g., a CM-GAN network) or U.S. patent application Ser. No. 18/052,121 entitled ANONYMIZING DIGITAL IMAGES UTILIZING A GENERATIVE ADVERSARIAL NEURAL NETWORK, both assigned to Adobe Inc., which are hereby incorporated by reference in their entireties.

Figure 4:
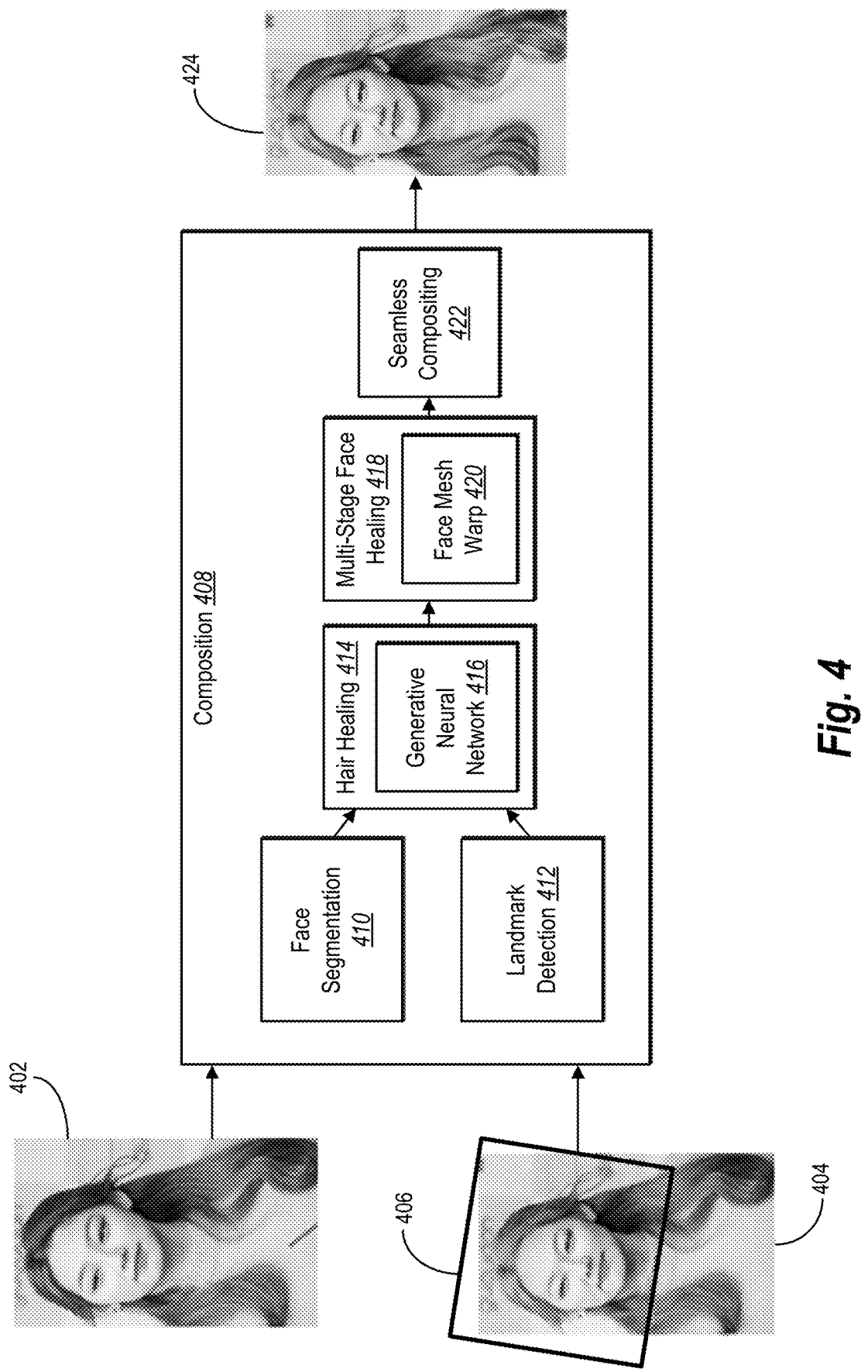
FIG. 4 illustrates an example diagram for generating a modified digital image using an image compositing process in accordance with one or more embodiments.

As mentioned above, in certain described embodiments, the hair blending system 102 generates a modified digital image by generating and blending replacement hair pixels to match an edit applied to a face crop. In particular, the hair blending system 102 receives an edit to a face crop and further generates replacement hair pixels for regions outside of the face crop to composite a realistic modified image. FIG. 4 illustrates an example diagram of a workflow for generating a realistic modified digital image in accordance with one or more embodiments.

As illustrated in FIG. 4, the hair blending system 102 identifies, receives, or accesses a digital image 402 depicting a face. In addition, the hair blending system 102 receives or applies an edit to the digital image 402 to thereby generate an edited digital image 404. For instance, the hair blending system 102 receives or applies an edit to pixels within a face crop 406. Indeed, in some instances, the hair blending system 102 identifies and generate the face crop 406 based on the tilt or rotation of the depicted face and further applies a particular edit to pixels within the face crop 406 (e.g., to increase the age of the face or the length of the hair). As shown, the face crop 406 is rotated to match an angle of the depicted face. As also shown, the edited digital image 404 depicts modified hair pixels within the face crop 406 and unmodified hair pixels outside of the face crop 406.

As further illustrated in FIG. 4, the hair blending system 102 performs a composition 408 to generate and blend replacement hair pixels for the edited digital image 404. For example, the hair blending system 102 performs one or more processes of the composition 408 using an image composition model. Indeed, the hair blending system 102 utilizes an image composition model to perform hair healing 414, multi-stage face healing 418, and/or seamless compositing 422. The processes of the composition 408 are described in further detail herein.

In particular, as part of the composition 408, the hair blending system 102 performs face segmentation 410 and landmark detection 412. Specifically, the hair blending system 102 performs face segmentation 410 using an instance segmentation model as described above. Indeed, the hair blending system 102 performs the face segmentation 410 to identify instances of faces depicted within the digital image 402 and/or the edited digital image 404. Additionally, the hair blending system 102 performs landmark detection 412 using a part segmentation model as described above. Indeed, the hair blending system performs the landmark detection 412 to identify or detect hair pixels within the digital image 402 and/or the edited digital image 404.

Based on performing the face segmentation 410 and the landmark detection 412, the hair blending system 102 further performs hair healing 414. To elaborate, as described above, the hair blending system 102 performs the hair healing 414 by generating replacement hair pixels utilizes a generative neural network 416 according to the process described above. Indeed, the hair blending system 102 utilizes the generative neural network 416 to generate replacement hair pixels for replacing hair pixels outside of the face crop 406 and that resemble hair pixels within the face crop 406.

In some embodiments, the hair blending system 102 further performs a multi-stage face healing 418. In particular, the hair blending system 102 utilizes face mesh warp 420 as part of the multi-stage face healing 418 to align textures and fix discrepancies, such as discrepancies in image resolution as well as in rotation (or other transformations) of the face crop 406. Indeed, in some embodiments, the hair blending system 102 generates replacement pixels and/or other image edits (e.g., for the face crop 406) at a resolution lower than the resolution of the digital image 402. For example, in some cases, the hair blending system 102 generates replacement hair pixels and/or other image edits at a resolution of 1024×1024 pixels, while the digital image 402 has a much resolution at 4K, 8K, or more. In addition, in certain instances, the hair blending system 102 performs the face segmentation 410, the landmark detection 412, and/or the hair healing 414 for an upright or vertical version of the face crop 406 (e.g., because some segmentation models and generative neural networks work less effectively on tilted faces and therefore modify face crops to be vertical).

To remedy the issues with the resolution discrepancy and the transformations to the face crop 406, the hair blending system 102 utilizes a face mesh warp 420. To elaborate, the hair blending system 102 utilizes the face mesh warp 420 to warp or augment replacement pixels and/or edited pixels corresponding to the face crop 406 to achieve a rotation that aligns with that of the face crop 406 and to further achieve a resolution that matches a resolution of the digital image 402. Accordingly, the hair blending system 102 generates a modified version of the replacement hair pixels at a higher resolution for blending the replacement hair pixels with the edited digital image 404. In addition, the hair blending system 102 achieves the proper rotation of the edited pixels of the face crop 406 using the face mesh warp 420 to match an angular rotation for edited pixels.

As further illustrated in FIG. 4, the hair blending system 102 performs seamless compositing 422. More specifically, the hair blending system 102 performs the seamless compositing 422 to seamlessly blend the (higher-resolution) replacement hair pixels and/or the rotated pixels edited for the face crop 406. Indeed, the hair blending system 102 blends the replacement hair pixels with the edited digital image to generate a modified digital image 424 that matches a resolution of the digital image 402, depicts the face tilted as in the digital image 402, depicts the image edits of the edited digital image 404 (e.g., within the face crop 406), and that further depicts the replacement hair pixels (for regions outside of the face crop 406) that visually resemble the edited hair pixels (within the face crop 406).

Figure 5:
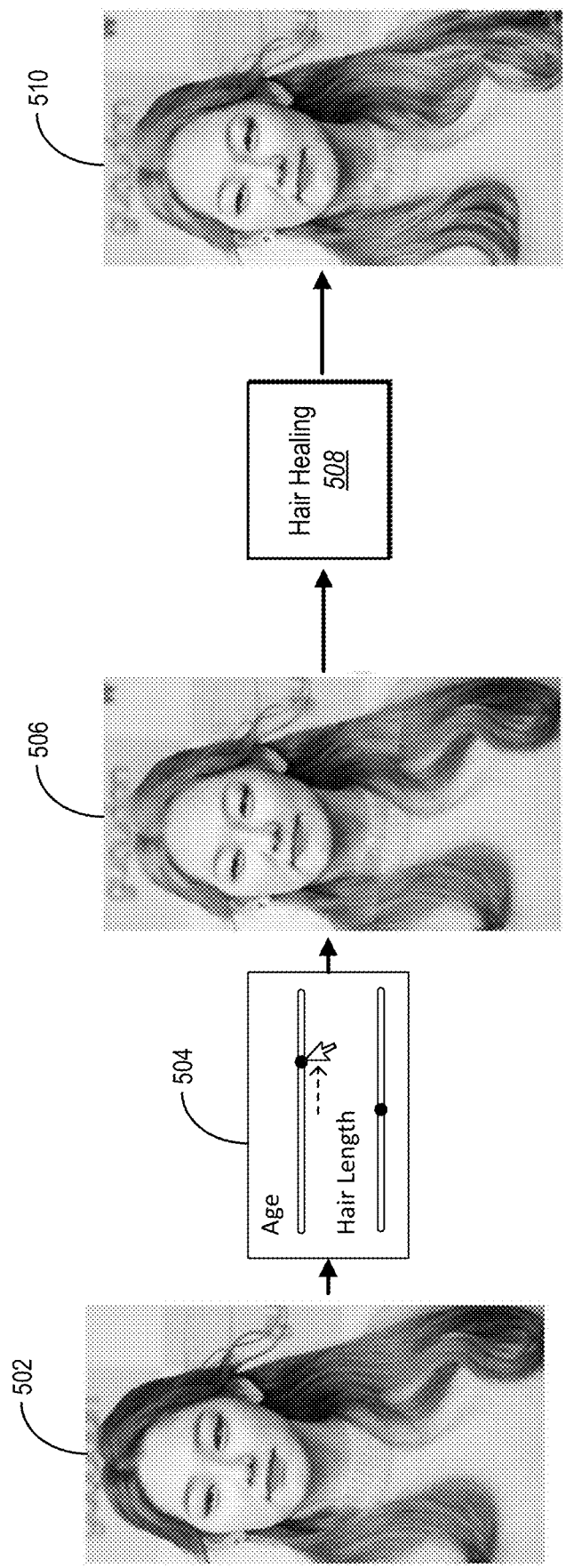
FIG. 5 illustrates an example diagram for generating a modified digital image based on direct or indirect modifications to hair appearance in accordance with one or more embodiments.

As mentioned above, in certain described embodiments, the hair blending system 102 generates a modified digital image to blend hair pixels based on image edits that directly or indirectly affect or impact hair appearance. For example, the hair blending system 102 edits a digital image to directly impact a hair appearance through changing a hair length, a hair color, a hair volume, a hair waviness, or some other visual hair trait. As another example, hair blending system 102 edits a digital image to indirectly impact a hair appearance through changing an age or an ethnicity of a face depicted within a digital image. FIG. 5 illustrates an example diagram for generating a modified digital image based on an image edit that directly or indirectly impacts hair appearance in accordance with one or more embodiments.

As illustrated in FIG. 5, the hair blending system 102 identifies, receives, or accesses a digital image 502. In addition, the hair blending system 102 receives an indication of a user interaction modifying the digital image 502. For example, the hair blending system 102 provides an interface element 504 for directly and/or indirectly modifying hair characteristics. As shown, the hair blending system 102 provides slider elements for adjusting an age of the face depicted within the digital image 502 and for adjust a hair length of the individual's hair. The hair blending system 102 further receives an indication to adjust the age of the slide in the form of a user interaction sliding the age slider to the right. Other indirect modifications including changing yaw and lighting for the digital image 502. As shown, the hair blending system 102 can further apply edits that directly impact hair appearance, such as hair length, hair color, hair waviness, or hair volume.

Based on the user interaction to increase the age via the interface element 504, the hair blending system 102 generates an edited digital image 506. Indeed, as described above, the hair blending system 102 generates the edited digital image 506 by utilizing a generative neural network (e.g., StyleGAN) to apply the requested age increase to the digital image 502. As shown, the hair blending system 102 applies the edit to pixels of the digital image 502 that are enclosed or encompassed by a face crop of the depicted face and pixels in the nearby surroundings. The hair outside of the face crop (e.g., below the shoulders) in the edited digital image 506 do not reflect the age change (e.g., with graying hair), and these portions of the hair pixels match those of the digital image 502.

As further illustrated in FIG. 5, the hair blending system 102 performs hair healing 508. More specifically, the hair blending system 102 performs the hair healing 508 to generate and apply replacement hair pixels and to utilizes a face mesh warp to composite a modified digital image 510 that seamlessly blends replacement hair pixels with the edited hair pixels to more accurately reflect the age increase via the interface element 504. Indeed, as described above, the hair blending system 102 utilizes a generative neural network to generate replacement hair pixels to apply to the edited digital image 506 to replace unedited hair pixels, as designated by a deep hair matte.

Figure 6:
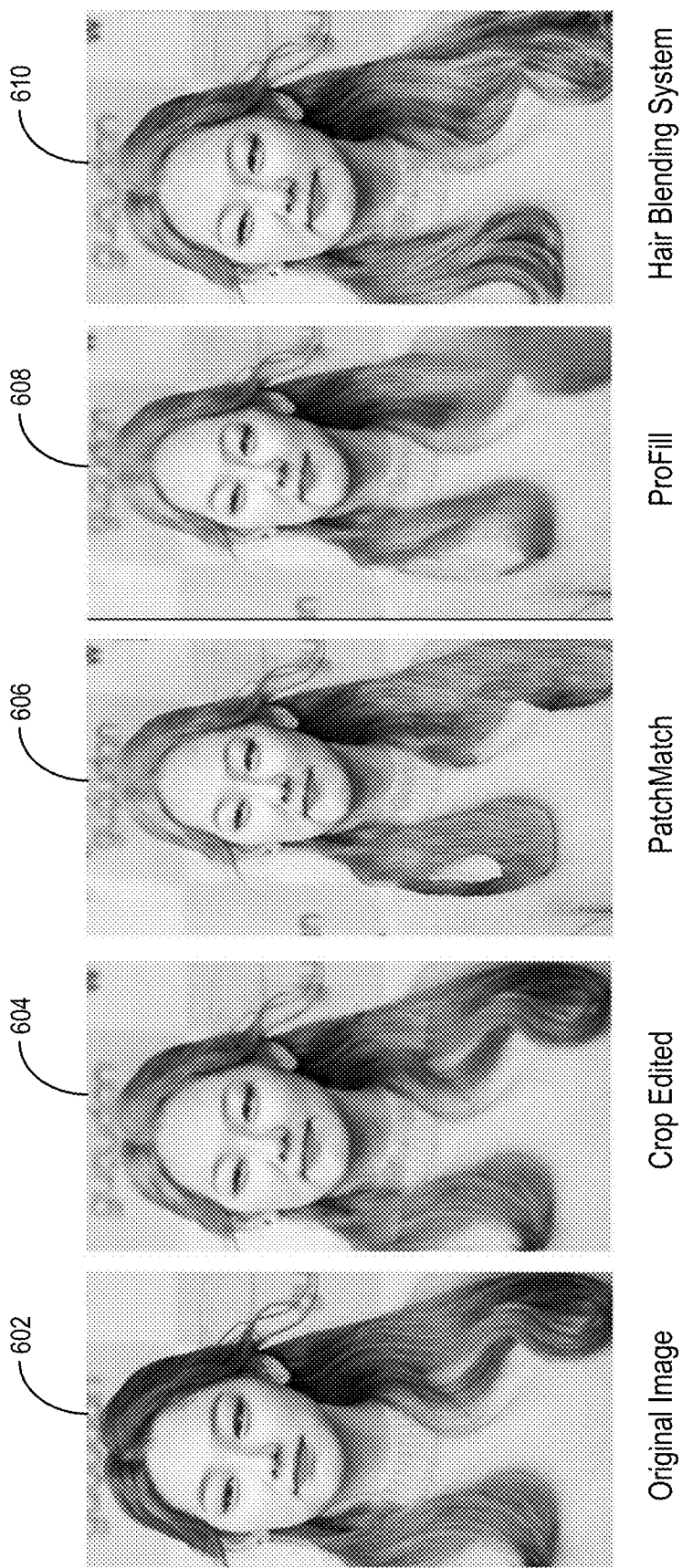
FIG. 6 illustrates an example comparison of modified digital images for different models in accordance with one or more embodiments.

As mentioned above, in certain embodiments, the hair blending system 102 generates more accurate modified images with smoother hair blending than is achievable using prior models and systems. Indeed, experimenters have demonstrated the accuracy improvements through visible results in applying different models to digital images. FIG. 6 illustrates an example comparison of images generated using various systems, including the hair blending system 102.

As illustrated in FIG. 6, the digital image 602 is an original digital image that is unmodified or unedited, viewable as a reference for the other images. As shown, the digital image 604 is an edited digital image generated by applying a generative neural network (e.g., StyleGAN) to edit one or more attributes of the digital image 602 (e.g., age) by applying edits to pixels within a face crop. In addition, the digital image 606 is a modified digital image generated by a PatchMatch model, such as that described by Connelly Barnes, Eli Shechtman, A. Finkelstein, and Dan Goldman in *PatchMatch: A Randomized Correspondence Algorithm for Structural Image Editing*, ACM Trans. Graph. 28(3):24 (2009). Further, the digital image 608 is a modified digital image generating by a ProFill model, such as that described by Y. Zeng, Z. Lin, J. Yang, J. Zhang, E. Shechtman, and H. Lu in *High-Resolution Image Inpainting with Iterative Confidence Feedback and Guided Upsampling*, European Conf. on Computer Vision, 1-17 (2020).

As further illustrated in FIG. 6, the digital image 610 is a modified digital image generated by the hair blending system 102 described herein. Comparing the digital image 610 with the digital image 606 and the digital image 608, the hair blending system 102 does far better generate realistic hair pixels that reflect the edit of the digital image 604. In addition, the hair blending system 102 more accurately and realistically blends the replacement hair pixels into the image for a more believable result.

To achieve such results, in some embodiments, the hair blending system 102 trains a generative neural network (e.g., a CoModGAN network) to generate replacement hair pixels. For example, the hair blending system 102 utilizes the Flickr-Faces-HQ ("FFHQ") dataset and applies a hair segmentation algorithm (e.g., involving an instance segmentation model and/or a part segmentation model) to each image in the dataset. For each image, the hair blending system 102 identifies each depicted face and finds the smallest rectangle that contains all the hair region of the detected face. The hair blending system 102 further crops out the depicted face and the hair region (note that the crops are not always square because hair regions vary widely across images). To adjust for the irregularly shaped crops, the hair blending system 102 normalizes the images by padding extra pixels on the larger edge to make a square, then resizes the crop to 1024×1024 pixels.

In some embodiments, the hair blending system 102 further makes the cropped region the same as the crop during inference to decrease the bias of the generative neural network. In addition, the hair blending system 102 masks the hair region outside of the cropped region and passes it as input to the generative neural network, generating the whole image without masking as the output. In some cases, the hair blending system 102 trains the generative neural network for 10K iterations at 1024×1024 resolution with a learning rate of 0.001. In certain embodiments, the hair blending system 102 does not use style mixing (to avoid combining latents), and the hair blending system 102 uses path length decay of 0.01 and ema ramp-up of 10. The hair blending system 102 also applies a perceptual loss of value 4.0 which improves the quality of results.

Figure 7:
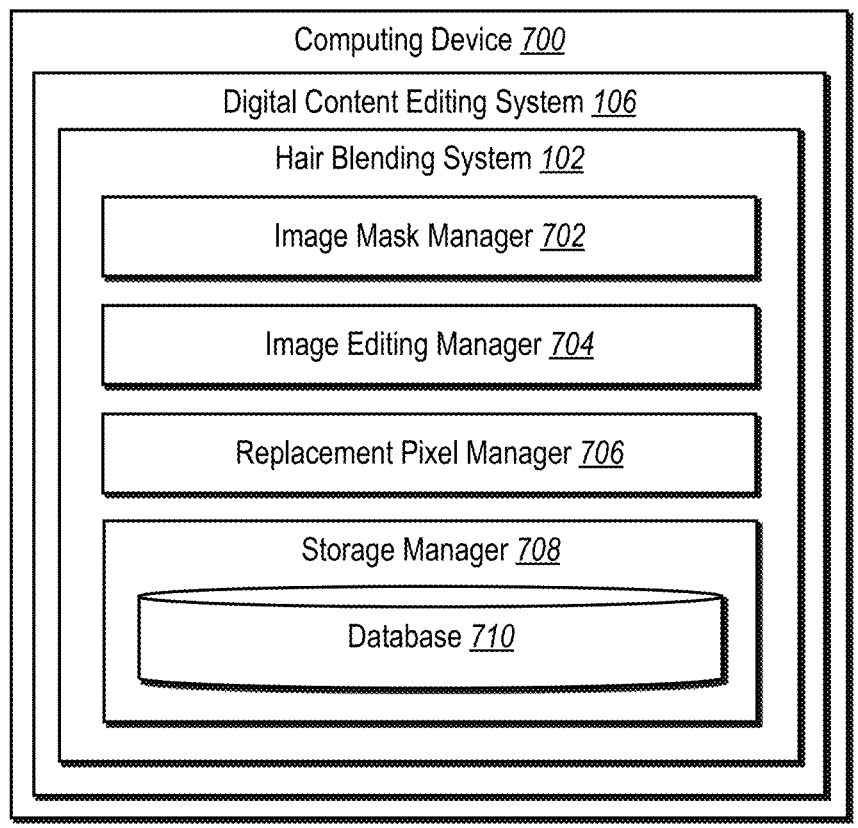
FIG. 7 illustrates an example schematic diagram of a hair blending system in accordance with one or more embodiments.

Looking now to FIG. 7, additional detail will be provided regarding components and capabilities of the hair blending system 102. Specifically, FIG. 7 illustrates an example schematic diagram of the hair blending system 102 on an example computing device 700 (e.g., one or more of the client device 108 and/or the server(s) 104). As shown in FIG. 7, the hair blending system 102 includes an image mask manager 702, an image editing manager 704, a replacement pixel manager 706, and a storage manager 708.

As just mentioned, the hair blending system 102 includes an image mask manager 702. In particular, the image mask manager 702 manages, maintains, generates, encodes, or extracts image masks from a digital image. For example, the image mask manager 702 utilizes an instance segmentation model to extract an instance segmentation map. In addition, the image mask manager 702 utilizes a part segmentation model to encode a part segmentation map. The image mask manager 702 further utilizes a deep matting model to generate a deep hair matte from the instance segmentation map and/or the part segmentation map.

In addition, the hair blending system 102 includes an image editing manager 704. In particular, the image editing manager 704 generates and applies one or more edits to a digital image. For example, the image editing manager 704 utilizes a generative neural network (e.g., StyleGAN) to generate and apply image edits, such as adjustments to age, yaw, lighting, hair length, hair color, hair volume, and/or hair waviness. In some cases, the image editing manager 704 applies the edits to a face crop of a digital image.

Further, the hair blending system 102 includes a replacement pixel manager 706. In particular, the replacement pixel manager 706 manages, maintains, generates, applies, and/or utilizes replacement hair pixels to modify a digital image. For example, the replacement pixel manager 706 generates replacement hair pixels from a deep hair matte and/or an edited digital image utilizing a generative neural network (e.g., CoModGAN). In some cases, the replacement pixel manager 706 utilizes a face mesh warp and/or compositing processes to blend replacement hair pixels with edited pixels of a digital image to match resolutions and other attributes for a seamless blending of pixels.

The hair blending system 102 further includes a storage manager 708. The storage manager 708 operates in conjunction with the other components of the hair blending system 102 and includes one or more memory devices such as the database 710 (e.g., the database 112) that stores various data such as digital images and neural networks. In some cases, the storage manager 708 also manages or maintains a generative neural network for modifying digital images using one or more additional components of the hair blending system 102 as described above.

In one or more embodiments, each of the components of the hair blending system 102 are in communication with one another using any suitable communication technologies. Additionally, the components of the hair blending system 102 are in communication with one or more other devices including one or more client devices described above. It will be recognized that although the components of the hair blending system 102 are shown to be separate in FIG. 7, any of the subcomponents may be combined into fewer components, such as into a single component, or divided into more components as may serve a particular implementation. Furthermore, although the components of FIG. 7 are described in connection with the hair blending system 102, at least some of the components for performing operations in conjunction with the hair blending system 102 described herein may be implemented on other devices within the environment.

The components of the hair blending system 102 include software, hardware, or both. For example, the components of the hair blending system 102 include one or more instructions stored on a computer-readable storage medium and executable by processors of one or more computing devices (e.g., the computing device 700). When executed by the one or more processors, the computer-executable instructions of the hair blending system 102 cause the computing device 700 to perform the methods described herein. Alternatively, the components of the hair blending system 102 comprise hardware, such as a special purpose processing device to perform a certain function or group of functions. Additionally, or alternatively, the components of the hair blending system 102 include a combination of computer-executable instructions and hardware.

Furthermore, the components of the hair blending system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the hair blending system 102 may be implemented as part of a stand-alone application on a personal computing device or a mobile device. Alternatively, or additionally, the components of the hair blending system 102 may be implemented in any application that allows creation and delivery of content to users, including, but not limited to, applications in ADOBE® EXPERIENCE MANAGER and CREATIVE CLOUD®, such as PHOTOSHOP®, LIGHTROOM®, and INDESIGN®. "ADOBE," "ADOBE EXPERIENCE MANAGER," "CREATIVE CLOUD," "PHOTOSHOP," "LIGHTROOM," and "INDESIGN" are either registered trademarks or trademarks of Adobe Inc. in the United States and/or other countries.

FIGS. 1-7 the corresponding text, and the examples provide a number of different systems, methods, and non-transitory computer readable media for generating a modified digital image by compositing replacement hair pixels using generative neural networks. In addition to the foregoing, embodiments can also be described in terms of flowcharts comprising acts for accomplishing a particular result. For example, FIG. 8 illustrates a flowchart of an example sequence or series of acts in accordance with one or more embodiments.

Figure 8:
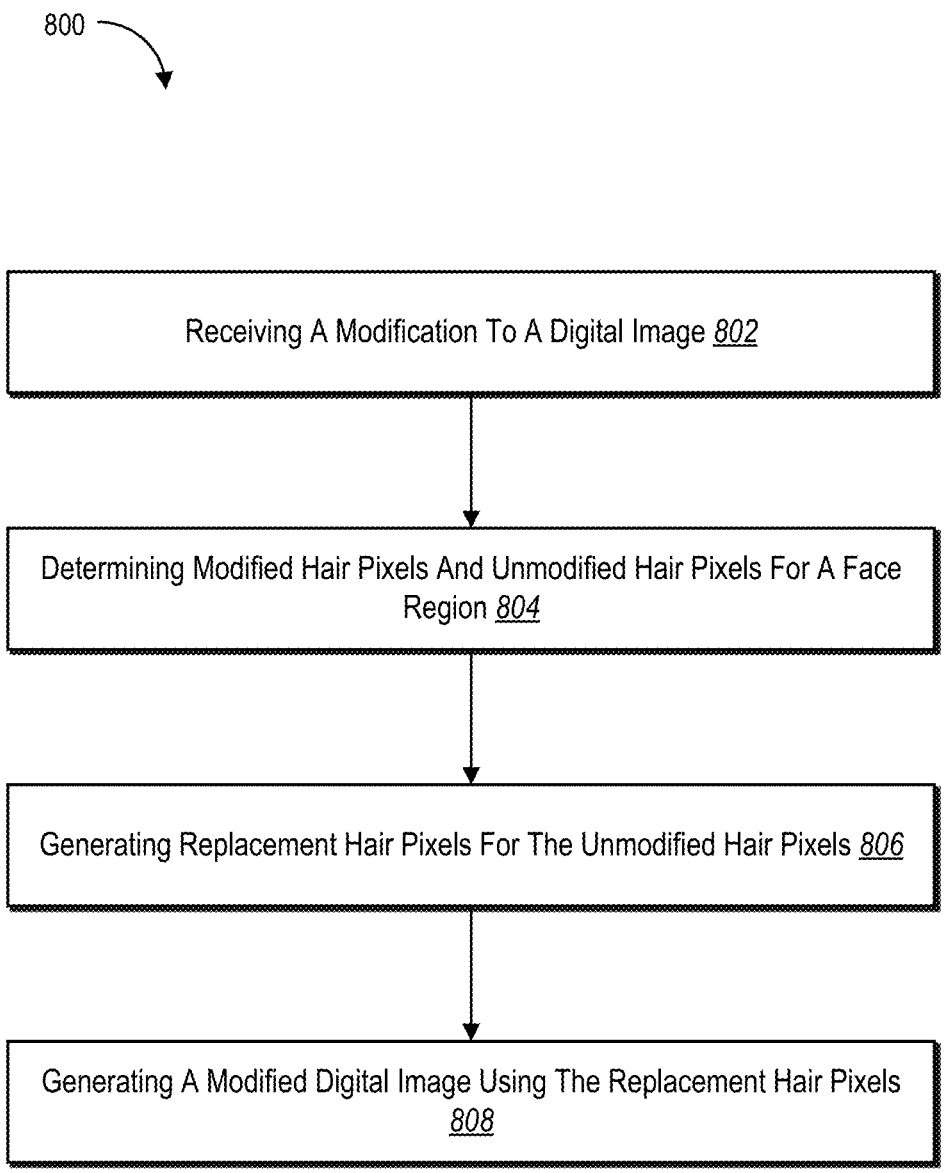
FIG. 8 illustrates an example flowchart of a series of acts for generating a modified digital image by blending hair pixels using a generative neural network in accordance with one or more embodiments.

While FIG. 8 illustrates acts according to a particular embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8. Additionally, the acts described herein may be repeated or performed in parallel with one another or in parallel with different instances of the same or other similar acts.

FIG. 8 illustrates an example series of acts 800 for generating a modified digital image by compositing replacement hair pixels using generative neural networks. In particular, the series of acts 800 includes an act 802 of receiving a modification to (a face crop of) a digital image. For example, the act 802 involves receiving a modification to a face region enclosing a face depicted within a digital image. In addition, the series of acts 800 includes an act 804 of determining modified hair pixels and unmodified hair pixels for a face region. For example, the act 804 involves determining, from the modification, modified hair pixels within the face region of the digital image and unmodified hair pixels outside of the face region of the digital image. In addition, the series of acts 800 includes an act 806 of generating replacement hair pixels for the unmodified hair pixels. For example, the act 806 involves generating, for the unmodified hair pixels outside of the face region, replacement hair pixels that resemble the modified hair pixels utilizing a generative neural network. Further, the series of acts 800 includes an act 808 of generating a modified digital image using the replacement hair pixels. For example, the act 808 involves generating, utilizing an image compositing model, a modified digital image by replacing the unmodified hair pixels outside of the face region with the replacement hair pixels.

In some embodiments, the series of acts 800 includes an act of determining the modified hair pixels within the face region comprises determining hair pixels affected by the modification to the face region and an act of determining the unmodified hair pixels outside of the face region comprises determining hair pixels unaffected by the modification to the face region. Further, the series of acts 800 includes an act of generating a deep hair matte from the digital image by utilizing a deep matting model to process image segmentations for the digital image. In some cases, the series of acts 800 includes acts of generating a cropped deep hair mask by cropping the deep hair matte according to the face region of the digital image and generating the replacement hair pixels by utilizing the generative neural network to generate pixels that resemble hair pixels indicated by the cropped deep hair mask.

In certain embodiments, the series of acts 800 includes an act of generating the deep hair matte by extracting, from the digital image, an instance segmentation map indicating one or more faces depicted within the digital image. In one or more instances, the series of acts 800 includes an act of generating the deep hair matte further by encoding, from the instance segmentation map, a part segmentation map defining hair pixels for the one or more faces depicted within the digital image. In these or other embodiments, the series of acts 800 includes an act of generating the modified digital image by utilizing a mesh warp to modify a resolution of the replacement hair pixels to match a resolution of the digital image.

In one or more embodiments, the series of acts 800 includes an act of receiving the modification to the face region by receiving an indication of applying a style modification neural network to pixels within the face region. In some cases, the series of acts 800 includes an act of generating the replacement hair pixels by utilizing the generative neural network to generate hair pixels indicated by the deep hair matte for replacing the unmodified hair pixels outside of the face region. In one or more embodiments, the series of acts 800 includes an act of utilizing a mesh warp to align textures of the replacement hair pixels with textures of the digital image.

In certain embodiments, the series of acts 800 includes acts of determining the modified hair pixels within the face region comprises determining hair pixels affected by the modification to the face region and determining the unmodified hair pixels outside of the face region comprises determining hair pixels unaffected by the modification to the face region. In some cases, the series of acts 800 also includes an act of providing the modified digital image for display on a client device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
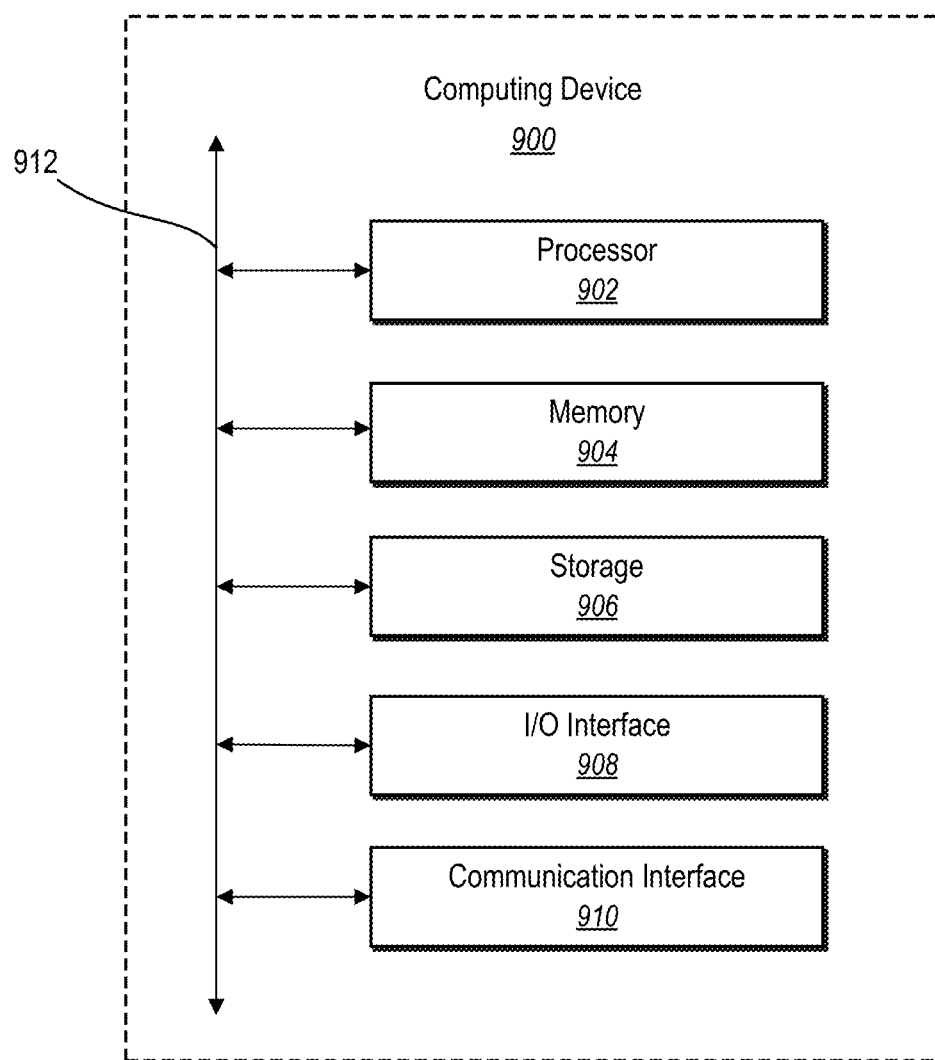
FIG. 9 illustrates a block diagram of an example computing device in accordance with one or more embodiments.

FIG. 9 illustrates, in block diagram form, an example computing device 900 (e.g., the computing device 700, the client device 108, and/or the server(s) 104) that may be configured to perform one or more of the processes described above. One will appreciate that the hair blending system 102 can comprise implementations of the computing device 900. As shown by FIG. 9, the computing device can comprise a processor 902, memory 904, a storage device 906, an I/O interface 908, and a communication interface 910. Furthermore, the computing device 900 can include an input device such as a touchscreen, mouse, keyboard, etc. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, storage device 906 can comprise a non-transitory storage medium described above. The storage device 906 may include a hard disk drive (HDD), flash memory, a Universal Serial Bus (USB) drive or a combination of these or other storage devices.

The computing device 900 also includes one or more input or output ("I/O") devices/interfaces 908, which are provided to allow a user to provide input to (such as user strokes), receive output from, and otherwise transfer data to and from the computing device 900. These I/O devices/interfaces 908 may include a mouse, keypad or a keyboard, a touch screen, camera, optical scanner, network interface, modem, other known I/O devices or a combination of such I/O devices/interfaces 908. The touch screen may be activated with a writing device or a finger.

The I/O devices/interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 908 is configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
identifying a modification to a face depicted within a face region of a digital image;
determining, from the modification utilizing a deep hair matte, modified hair pixels within the face region of the digital image and unmodified hair pixels outside of the face region of the digital image;
generating, utilizing a generative neural network for the unmodified hair pixels outside of the face region, replacement hair pixels that resemble the modified hair pixels; and
generating, utilizing an image compositing model, a modified digital image by replacing the unmodified hair pixels outside of the face region with the replacement hair pixels.

2. The method of claim 1, wherein:
determining the modified hair pixels within the face region comprises determining hair pixels affected by the modification to the face region; and
determining the unmodified hair pixels outside of the face region comprises determining hair pixels unaffected by the modification to the face region.

3. The method of claim 1, further comprising generating the deep hair matte from the digital image by utilizing a deep matting model to process image segmentations for the digital image.

4. The method of claim 3, further comprising:
generating a cropped deep hair mask by cropping the deep hair matte according to the face region of the digital image; and
wherein generating the replacement hair pixels comprises utilizing the generative neural network to generate pixels that resemble hair pixels indicated by the cropped deep hair mask.

5. The method of claim 3, wherein generating the deep hair matte comprises extracting, from the digital image, an instance segmentation map indicating one or more faces depicted within the digital image.

6. The method of claim 5, wherein generating the deep hair matte further comprises encoding, from the instance segmentation map, a part segmentation map defining hair pixels for the one or more faces depicted within the digital image.

7. The method of claim 1, wherein generating the modified digital image comprises utilizing a mesh warp to modify a resolution of the replacement hair pixels to match a resolution of the digital image.

8. A system comprising:
a memory component; and
one or more processing devices coupled to the memory component, the one or more processing devices to perform operations comprising:
identifying a modification to a face depicted within a face region of a digital image;
determining, from the modification, modified hair pixels within the face region of the digital image and unmodified hair pixels outside of the face region of the digital image by generating a deep hair matte from a part segmentation map of the digital image;
generating, utilizing a generative neural network for the unmodified hair pixels outside of the face region, replacement hair pixels that resemble the modified hair pixels; and
generating, utilizing an image compositing model, a modified digital image by replacing the unmodified hair pixels outside of the face region with the replacement hair pixels.

9. The system of claim 8, wherein identifying the modification to the face depicted within the face region of the digital image comprises receiving an indication of applying a style modification neural network to pixels within the face region.

10. The system of claim 8, wherein generating the deep hair matte comprises:
extracting, from the digital image, an instance segmentation map indicating the face depicted within the digital image;
encoding, from the instance segmentation map, a part segmentation map defining hair pixels for the face depicted within the digital image; and
utilizing a deep matting model to generate the deep hair matte from the part segmentation map.

11. The system of claim 8, wherein generating the replacement hair pixels comprises utilizing the generative neural network to generate hair pixels indicated by the deep hair matte for replacing the unmodified hair pixels outside of the face region.

12. The system of claim 8, wherein generating the modified digital image comprises utilizing a mesh warp to align textures of the replacement hair pixels with textures of the digital image.

13. The system of claim 8, wherein:
determining the modified hair pixels within the face region comprises determining hair pixels affected by the modification to the face region; and
determining the unmodified hair pixels outside of the face region comprises determining hair pixels unaffected by the modification to the face region.

14. The system of claim 8, further comprising providing the modified digital image for display on a client device.

15. A non-transitory computer readable medium storing instructions which, when executed by a processing device, cause the processing device to perform operations comprising:
identifying a modification to a face depicted within a face region of a digital image;
determining, from the modification utilizing a deep hair matte, modified hair pixels within the face region of the digital image and unmodified hair pixels outside of the face region of the digital image;
generating, utilizing a generative neural network for the unmodified hair pixels outside of the face region, replacement hair pixels that resemble the modified hair pixels; and
generating, utilizing an image compositing model, a modified digital image by replacing the unmodified hair pixels outside of the face region with the replacement hair pixels.

16. The non-transitory computer readable medium of claim 15, wherein:
determining the modified hair pixels within the face region comprises determining hair pixels affected by the modification to the face region; and
determining the unmodified hair pixels outside of the face region comprises determining hair pixels unaffected by the modification to the face region.

17. The non-transitory computer readable medium of claim 15, further comprising generating the deep hair matte from the digital image by utilizing a deep matting model to process image segmentations for the digital image.

18. The non-transitory computer readable medium of claim 17, further comprising:
- generating a cropped deep hair mask by cropping the deep hair matte according to the face region of the digital image; and
- wherein generating the replacement hair pixels comprises utilizing the generative neural network to generate pixels that resemble hair pixels indicated by the cropped deep hair mask.

19. The non-transitory computer readable medium of claim 17, wherein generating the deep hair matte comprises extracting, from the digital image, an instance segmentation map indicating one or more faces depicted within the digital image.

20. The non-transitory computer readable medium of claim 19, wherein generating the deep hair matte further comprises encoding, from the instance segmentation map, a part segmentation map defining hair pixels for the one or more faces depicted within the digital image.

* * * * *